United States Patent [19]
Huddleston et al.

[11] 3,911,259
[45] Oct. 7, 1975

[54] MEANS FOR CONTROLLING THE REFLUX RATE AND THE REBOILER TEMPERATURE OF A TOWER

[75] Inventors: Dennis Huddleston, Norwalk, Conn.; Robert J. Kale, Charlotte, N.C.

[73] Assignee: Texaco Inc., New York, N.Y.

[22] Filed: Apr. 11, 1974

[21] Appl. No.: 460,242

[52] U.S. Cl. ............... 235/151.12; 202/160; 203/1; 208/DIG. 1
[51] Int. Cl.² ...................... B01D 3/42; G06G 7/58
[58] Field of Search .................... 235/151.12, 150.1; 202/160, 206; 203/1–3, DIG. 18; 208/308, 347, DIG. 1

[56] References Cited
UNITED STATES PATENTS

| | | | |
|---|---|---|---|
| 3,034,307 | 5/1962 | Berger | 235/151.12 X |
| 3,143,643 | 8/1964 | Fluegel et al. | 235/151.12 X |
| 3,296,097 | 1/1967 | Lupfer | 235/151.12 X |
| 3,361,646 | 1/1968 | MacMullan et al. | 235/151.12 X |
| 3,449,215 | 6/1969 | Johnson et al. | 235/151.12 X |
| 3,463,725 | 8/1969 | MacFarlane | 235/151.12 X |

*Primary Examiner*—Joseph F. Ruggiero
*Attorney, Agent, or Firm*—Thomas H. Whaley; Carl G. Ries; Ronald G. Gillespie

[57] ABSTRACT

The reflux rate of the overhead product from a tower and the reboiler temperature are automatically controlled utilizing the equations hereinafter mentioned. The control system includes sensors sensing the temperatures of the overhead product leaving the tower, of a portion of the overhead product being returned to the tower, and of the bottoms product leaving the tower. The flow rates of the feedstock and the portion of overhead product being returned to the tower are also sensed. A control system then calculates a desired reflux rate and reboiler temperature based on the sensed parameters and a current cycle of operations and a next previous cycle of operation. The control system stores all current data so that the data may be used in a subsequent cycle of operation as the next previous cycle information.

8 Claims, 5 Drawing Figures

MEANS FOR CONTROLLING THE REFLUX RATE AND THE REBOILER TEMPERATURE OF A TOWER

BACKGROUND OF THE INVENTION

Field of the Invention

The system of the present invention relates to control systems in general, and more particularly, to a control system for a fractionation tower.

SUMMARY OF THE INVENTION

A control system controls a fractionation tower receiving feedstock at a predetermined rate. A portion of the overhead product provided by the fractionation tower is fed back to the tower. A portion of the bottoms product provided by the fractionation tower is also fed back to the tower. The control system includes sensors sensing the temperatures of the overhead product leaving the tower and of the feedback portion of the bottoms product and provides corresponding signals. The flow rates of the feedstock and of the feedback portion of the overhead product are also sensed by sensors which provide corresponding signals. Chromatographs provide signals corresponding to the mol percent impurities in the overhead product and The bottoms product. The flow rate of the feedback portion of the overhead product and the temperature of the bottoms product are controlled in accordance with the sensed flow rate signals, the sensed temperature signals and the sensed impurities signals.

The objects and advantages of the invention will appear hereafter from consideration of the detailed description which follows, taken together with the accompanying drawings, wherein one embodiment of the invention is illustrated by way of example. It is to be expressly understood, however, that the drawings are for illustration purposes only, and are not to be construed as defining the limits of the invention.

DESCRIPTION OF THE INVENTION

Figure 1:
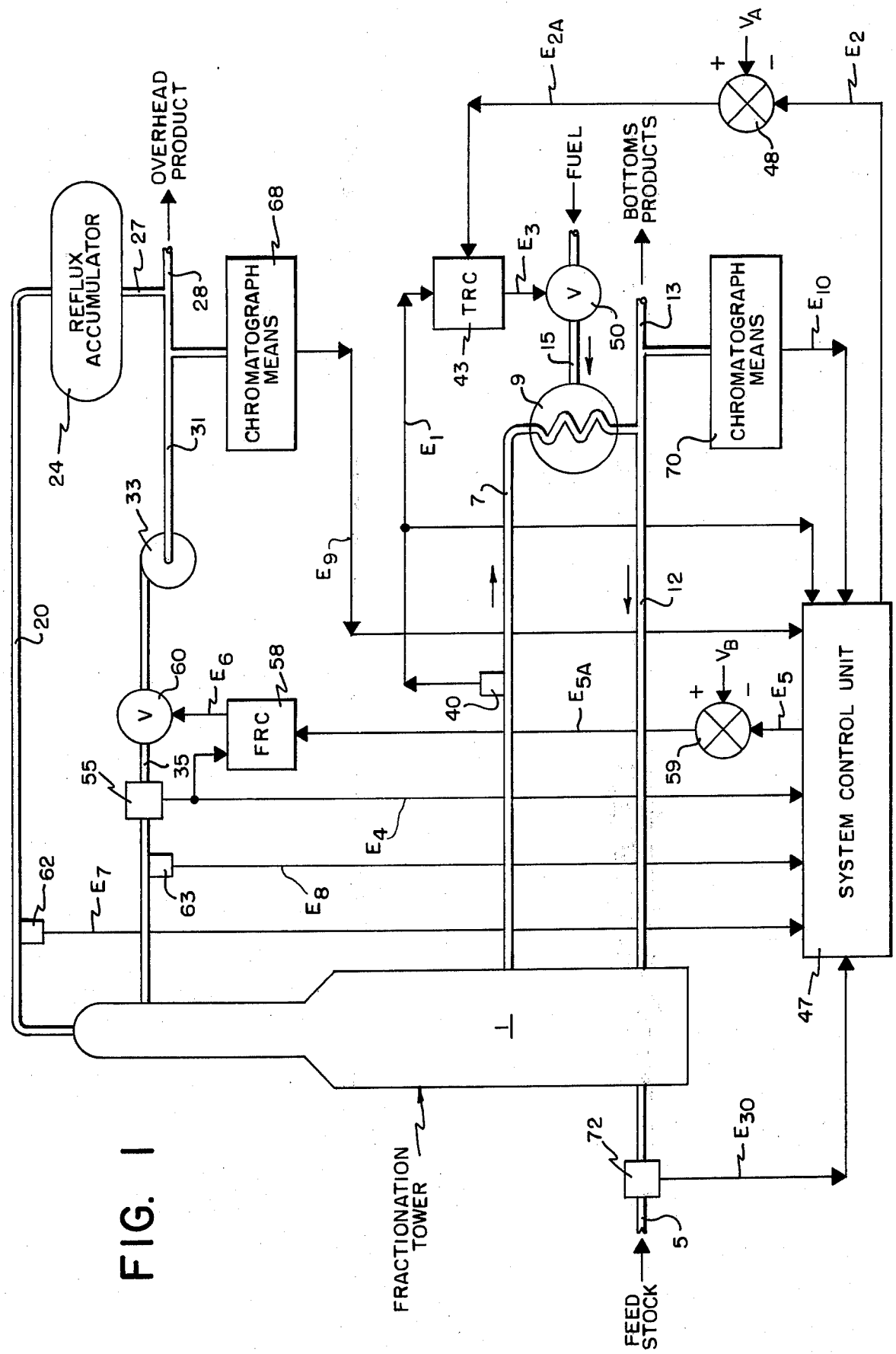
FIG. 1 is a partial simplified block diagram and a partial schematic of a control system, constructed in accordance with the present invention, for controlling a fractionation tower.

Usually fractionation towers are controlled by controlling the temperature of the reboiler at the bottom of the tower and the rate of reflux over the top of the tower. Adjustments in these two process variables are made periodically by the fractionator operator based on tests of product purity. The frequency of these adjustments will vary depending on the amount of other equipment that the fractionator operator is monitoring and the number of problems he is experiencing with other equipment. The size of these adjustments will also vary depending on the individual fractionator operator's experiences and understanding of the fractionation equipment. This often leads to inconsistent product quality and occasionally results in production of off-spec. product. Referring to FIG. 1 there is shown a control system for controlling fractionation towers so as to avoid inconsistent product quality or off-spec. products.

A determined target reflux rate $RE_{DT}$ may be determined in accordance with the following empirically derived equation 1.

$$1. \quad RE_{DT} = \left\{ \frac{RI_1}{1+FK(TO_c-TR_c)} \right\}$$

$$\left\{ 1+K_1\left(\frac{ERO_c+K_2(ERO_1)+K_3(ERO_2)}{RE_1}\right)\right\} +K_4(TO_c-TO_1)$$

where $RI_1$ is the internal reflux rate (GPM) during a next previous operational step, $RE_1$ is the external reflux rate (GPM) during the next previous operational step, $FK$ is the ratio of the heat of vaporization of the top tray liquid to the heat capacity of that liquid at constant pressure, $TO_c$ is the tower overhead vapor temperature for the current operational step; $TO_1$ is the overhead tower vapor temperature for the next previous operational step, $TR_c$ is the reflux temperature for the current operational step. $ERO_c$, $ERO_1$, and $ERO_2$ are differences between the desired mol percent of the impurities in the overhead product and the actual mol percent of impurities for the current, next previous, and second next previous operational steps, and $K_1$ through $K_4$ are empirically derived constants for a particular tower and may have values of 40 to 80, 0 to −5, 0 to 4 and 0.1 to 1.75, respectively.

A determined target reboiler temperature $TB_{DR}$ may be determined from the following equation 2.

$$2. \quad TB_{DT} = TB_1 + K_5\{ERB_c+K_6(ERB_1)+K_7(ERB_2)+K_8(FD_c-FD_1)\}$$

where $TB_1$ is the reboiler temperature for the next previous operational step; $ERBC$, $ERB_1$ and $ERB_2$ are differences between the desired mol percent of impurities in the bottoms product and the actual mol percent of impurities for the current, the next previous operational steps, $FD_c$ and $FD_1$, are feedstock flow rates for the current and the next previous operational steps, respectively, and $K_5$ through $K_8$ are empirically derived constants for a particular tower and have values of 0 to 7.0, −0.35 to −7.0, 0.15 to 0.30 and 0 to 2.0.

The internal reflux rate $RI_c$ for the current operational step, must also be determined so that a next previous $RI_1$ may be determined for use in equation 1 and is accomplished by using equation 3.

$$3. \quad RI_c = RE_1 (1+FK)(TO_c-TR_c)$$

Referring now to FIG. 1, fractionation tower 1 receives feedstock by way of inlet pipe 5. The reboiler temperature is controlled by passing the bottom product through a line 7 to a reboiler 9. A portion of the bottom products is returned to fractionation tower 1 by way of line 12 while the remainder is provided as bottom product through line 13. Fuel for heating the stock in reboiler 9 by way of a line 15.

In the overhead product reflux system, the overhead product leaves fractionation tower 1 by way of a line 20 which leads to a reflux accumulator 24. The overhead product leaves reflux accumulator 24 by way of lines 27 and 28. A portion of the overhead product is recycled to tower 1 through line 31, a pump 33 and another line 35.

The temperature of reboiler 9 is controlled by sensing the temperature of the bottom product in line 7 with a conventional type temperature sensor 40 which provides a signal $E_1$ corresponding to the temperature $TB_c$ of the bottom product returned to fractionation tower 1. Signal $E_1$ is provided to a temperature recorder controller 43 and to a system control unit 47 which also provides a signal $E_2$ corresponding to a determined target temperature to subtracting means 48 where it is subtracted from a direct current voltage $V_A$ corresponding to a target reboiler temperature. Subtracting means 48 provides a difference signal $E_{2A}$ to temperature recorder controller 43. Difference signal $E_{2A}$ corresponds to an adjustment to the target temperature. Signal $E_{2A}$ adjusts the set points of temperature recorder controller 43 so that when there is a difference between the temperature as indicated by signal $E_1$ and the adjusted target temperature, controller 43 provides a difference signal $E_3$ to a valve in line 15 to control the fuel being provided to reboiler 9 so as to regulate the temperature of the bottoms products being provided back to fractionation tower 1.

The reflux rate is controlled by sensing the flow rate of the overhead product in line 35 with a conventional type flow rate sensor 55 which provides a signal $E_4$ corresponding to the sensed external reflux flow rate ($RE_c$) to a conventional type flow rate recorder controller 58 and to system control unit 47. System control unit 47 also provides a signal $E_5$ corresponding to a determined target reflux flow rate to flow recorder controller 58. Subtracting means 59 which subtracts a direct current voltage $V_B$, corresponding to a desired target reflux flow rate, to provide a signal $E_{5A}$ corresponding to an adjustment to the desired reflux rate. Flow recorder controller 58 provides a difference signal $E_6$, corresponding to the difference between the adjusted target reflux flow rate and the sensed reflux flow rate, to control a valve 60 in line 35 so that the reflux flow rate in line 35 substantially assumes the determined reflux flow rate.

In addition, temperature sensors 62 and 63 in lines 20 and 35, respectively, sense the temperatures of the vapor in line 20 and of the reflux overhead product entering fractionation tower 1, respectively and provides corresponding signals $E_7$ and $E_8$, respectively. In addition, chromatograph means 68 provides a signal $E_9$ corresponding to the mol percent of impurities ($ERO_c$) in the overhead product while chromatograph means 70 provides a signal $E_{10}$ corresponding to the mol percent of impurities ($ERB_c$) in the bottoms product. Chromatograph means 68 and 70 may be of a type described and disclosed in U.S. Pat. No. 3,733,474. In addition to the circuitry shown in the aforementioned patent, the normalized signal corresponding to the impurities are summed and the sum signal is divided by the sum signal of all the normalized signals to provide either signal $E_9$ or $E_{10}$.

A flow rate sensor 72 senses the flow rate of the feedstock entering tower 1.

Figure 2:
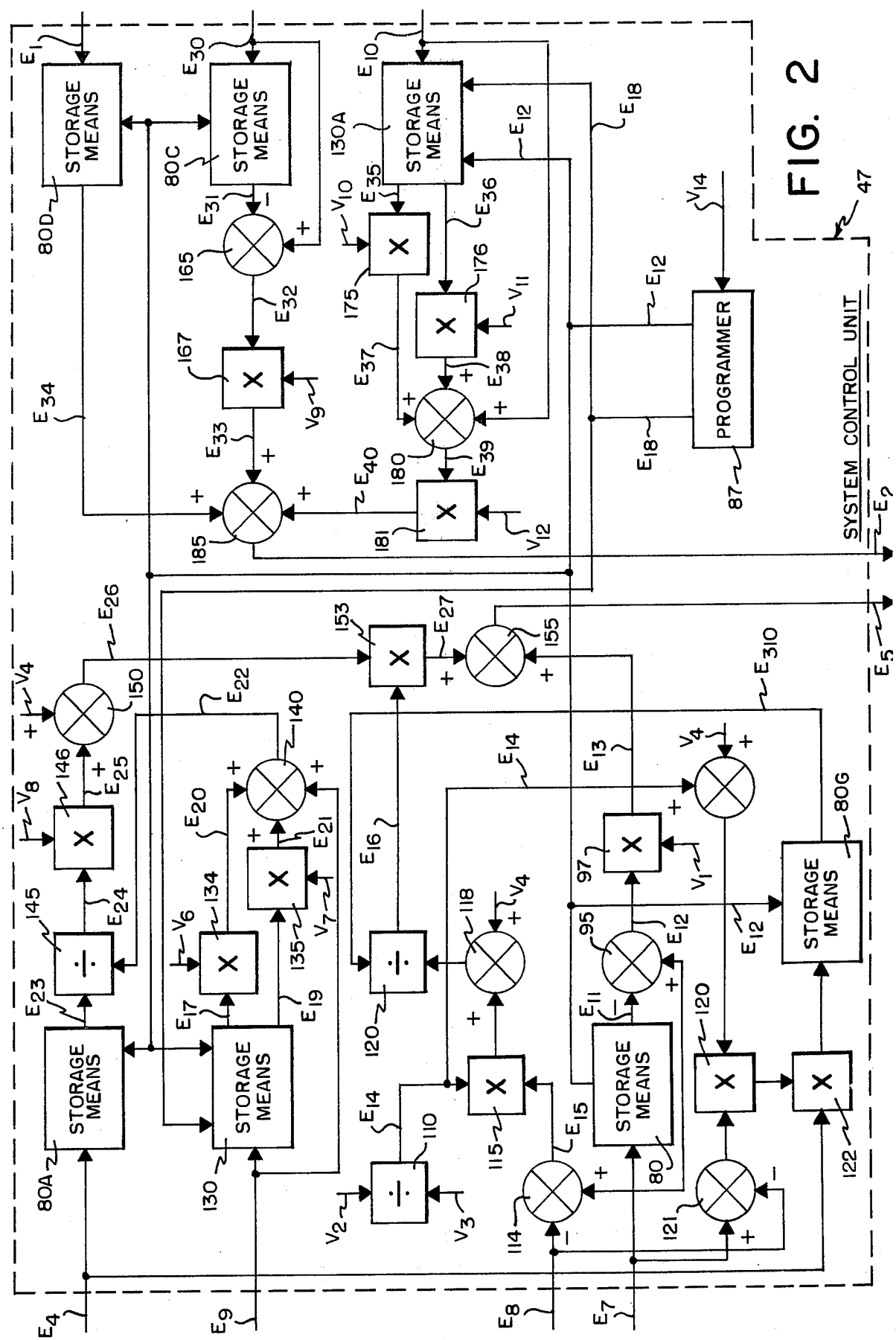
FIG. 2 is a detailed block diagram of the system control unit shown in FIG. 1.
Figure 3:
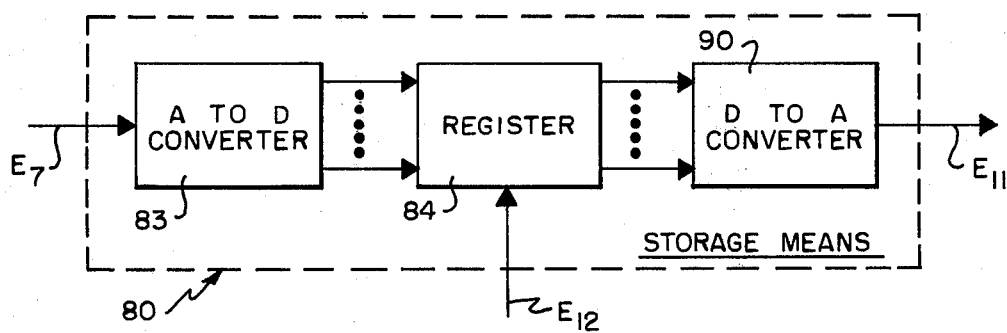
FIGS. 3, 4 and 5 are detailed block diagrams of two different type storage means and the programmer shown in FIG. 2.
Figure 4:
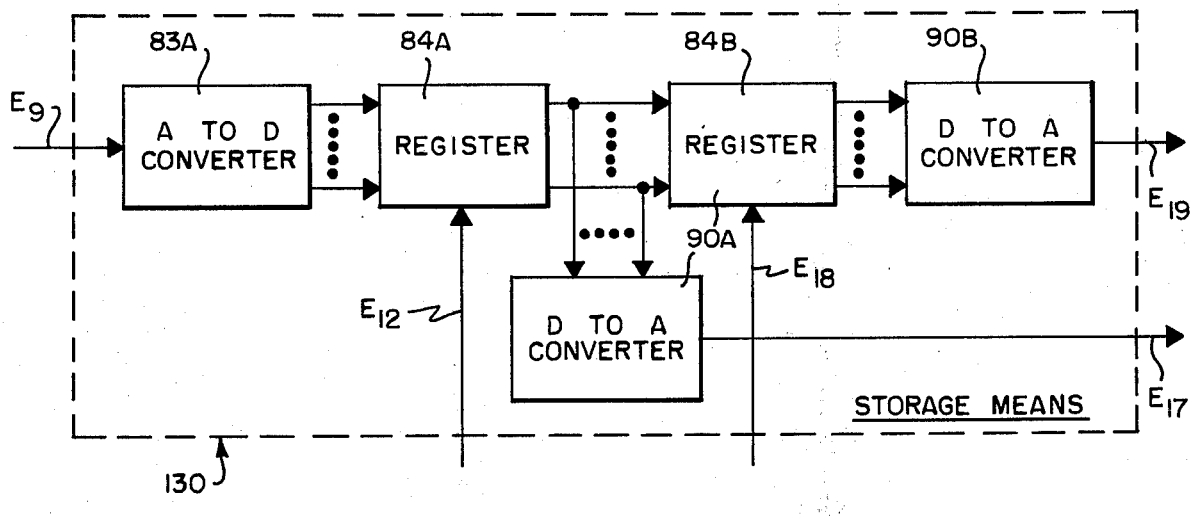

Referring to FIGS. 2 and 3, signal $E_7$ is applied to storage means 80 which provides a signal $E_{11}$ corresponding to the $TO_1$ in equation 1. Storage means 80 includes a conventional type anolog-to-digital converter 83 which provides digital outputs to a digital register 84. Register 84 is controlled by a pulse signal $E_{12}$ provided by a programmer 87 to enter the digital signals provided to converter 90 which converts the digital signal to an analog signal $E_{11}$. Signal $E_{11}$ corresponds to the temperature ($TO_1$) of the overhead product for a next previous cycle of operation.

Subtracting means 95 subtracts signal $E_{11}$ from signal $E_7$ to provide a signal $E_{12}$ corresponding to the term ($TO_c-TO_1$) in equation 1. A multiplier 97 multiplies signal $E_{12}$ with a direct current voltage $V_1$ from a source, not shown, of direct current voltages. The source of direct current voltages is not shown since it is believed that the connecting of all direct current voltage lines would only confuse the drawing. All direct current voltages hereinafter described will be provided by that direct current voltage source. Voltage $V_1$ corresponds to the constant $K_4$ in equation 1 and multiplier 97 provides a signal $E_{13}$ corresponding to the term $K_4(TO_c-TO_1)$.

A divider 110 divides a direct current voltage $V_2$ corresponding to the heat of vaporization of the top tray liquid by another direct current voltage $V_3$ which corresponds to the heat capacity of the top tray liquid to provide a signal $E_{14}$ corresponding to the term FK in equation 1. Subtracting means 114 subtracts signal $E_8$ from signal $E_7$ to provide a signal $E_{15}$, corresponding to the term ($TO_c-TR_c$) in equation 1. A multiplier 115 with a direct current voltage $V_4$ corresponding to 1 to provide a signal corresponding to $1+FK(TO_c-TR_c)$.

Summing means 119 sums signal $E_{14}$ with voltage $V_4$ to provide a signal, corresponding to the term $1+FK$ in equation 3, to a multiplier 120. Subtracting means 121 subtracts signal $E_8$ from signal $E_7$ to provide a signal, corresponding to the term ($TO_c-TR_c$) in equation 3, to multiplier 120. Multiplier 120 provides a product signal corresponding to $(1+FK)(TO_c-TR_c)$ to another multiplier 122. Multiplier 122 multiplies the signal from multiplier 120 with signal $E_4$ to provide a signal, corresponding to the current internal reflux rate $RF_c$, to storage means 80G. Elements identified with a number and a letter, are connected and operate in a similar manner as those elements having the same number without a letter. Storage means 80G is controlled by pulses $E_{12}$ from programmer 87 to provide a signal $E_{310}$ corresponding to the internal reflux rate $RI_1$.

Divider 120 divides signal $E_{310}$ with the signal from summing means 118 to provide a signal $E_{16}$ corresponding $$\text{to the term } \frac{RI_1}{1+FK(TO_c-TR_c)}.$$

Signal $E_9$ is applied to storage means 130 which is shown in greater detail in FIG. 3. A conventional type analog-to-digital converter 133 is storage means 130 converts signal $E_9$ to digital signals which are applied to a register 84A. The entering of the digital signals in register 84A is controlled by pulse signal $E_{12}$. Register 84 provides digital signals to a digital-to-analog converter 90A which converts the digital signals to an analog signal $E_{17}$ corresponding to the mol percent of impurities $ERO_1$ in the overhead stream for the next previous cycle. Register 84A also provides the digital signals to another register 84B. The entry of the digital signals into register 84B is controlled by a pulse $E_{18}$ provided by programmer 87 as hereinafter explained. Register 84B stores and provides the digital signals to another digitalto-analog converter 90B which converts the digital signals to an analog signal $E_{19}$ corresponding to the mol percent of impurities $ERO_2$ in the overhead stream for the second next previous cycle. A multiplier 134 multiplies signal $E_{17}$ with a direct voltage $V_6$ corresponding to the constant $K_2$ in equation 1 to provide a signal $F_{20}$. Another multiplier 135 multiplies signal $E_{19}$ with a direct current voltage $V_7$ corresponding to the constant $K_3$ in equation 1, to provide a signal $E_{21}$. Summing means 140 sums signals $E_9$, $E_{20}$ and $E_{21}$ to provide a signal $E_{21}$. Summing means 140 sums signals $E_9$, $E_{20}$ and $E_{21}$ to provide a signal $E_{22}$ corresponding to the expression $ERO_c + K_2 (ERO_1) + K_3 (ERO_c)$ in equation 1.

Signal $E_4$ is applied to storage means 80A which is controlled by pulse $E_{12}$ to provide a signal $E_{23}$, corresponding to the external reflux rate $RE_1$ for the next previous operating step. A divider 145 divides signal $E_{22}$ with a signal $E_{23}$ to provide a signal $E_{24}$ to a multiplier 146. Multiplier 146 multiplies signal $E_{24}$ with a direct current voltage $V_8$, corresponding to the constant $K_1$ in equation 1 to provide a signal $E_{25}$. Summing means 150 sums signal $E_{25}$ with voltage $V_4$ to provide a signal $E_{21}$. A multiplier 153 multiplies signals $E_{16}$, $E_{26}$ to provide a signal $E_{27}$ which is summed with signal $E_{13}$ by summing means 155 to provide signal $E_5$.

Continuing to refer to FIGS. 1 and 2, the signal $E_{30}$ from flow rate sensor 72 corresponds to the flow rate of the feedstock to tower 1. Signal $E_{30}$ is applied to storing means 80C in system control unit 47. Storage means 80C is controlled by pulses $E_{12}$ to $E_{31}$ corresponding to the flow rate of the feedstock for the next previous cycle. Subtracting means 165 subtracts signal $E_{31}$ from signal $E_{30}$ to provide a signal $E_{32}$ corresponding to the term $(FD_c-FD_1)$ in equation 2. A multiplier 167 multiplies signal $E_{32}$ with a direct current voltage $V_9$ corresponding to constant 8 in equation 2, to provide a signal $E_{33}$ corresponding to the expression $K_8 (FD_c-FD_1)$.

Signal $E_1$ is provided to storage means 80D which is controlled by pulses $E_{12}$ to provide a signal $E_{34}$ corresponding to the reboiler temperature $TB_1$ for the next previous cycle. Signal $E_{10}$ is provided to storage means 130A which is controlled pulses $E_{12}$, $E_{18}$. Storage means 130A provides signals $E_{35}$, $E_{36}$, corresponding to the mol percent of impurities in the bottom streams for the next previous cycle ($ERB_1$) and for the second next previous cycle ($ERB_2$), respectively. Multipliers 175, 176 multiply signals $E_{35}$ and $E_{36}$ respectively with direct current voltages $V_{10}$ and $V_{11}$ respectively. Voltages $V_{10}$ and $V_{11}$ correspond to constants $K_6$ and $K_7$, respectively. Summing means 180 sums signals $E_{10}$, $E_{37}$ and $E_{38}$ to provide a signal $E_{39}$ to a multiplier 182. Signal $E_{39}$ corresponds to the expression $ERB + K_6 (ERB_1) + E_7 (ERB_2)$. Multiplier 181 multiplies signal $E_{39}$ with a direct current voltage $V_{12}$ corresponding to the constant $K_5$, to provide a signal $E_{40}$. Summing means 185 sums signals $E_{33}$, $E_{34}$ and $E_{40}$ to provide signal $E_2$ corresponding to the determined target bottom product temperature $TB_c$.

Figure 5:
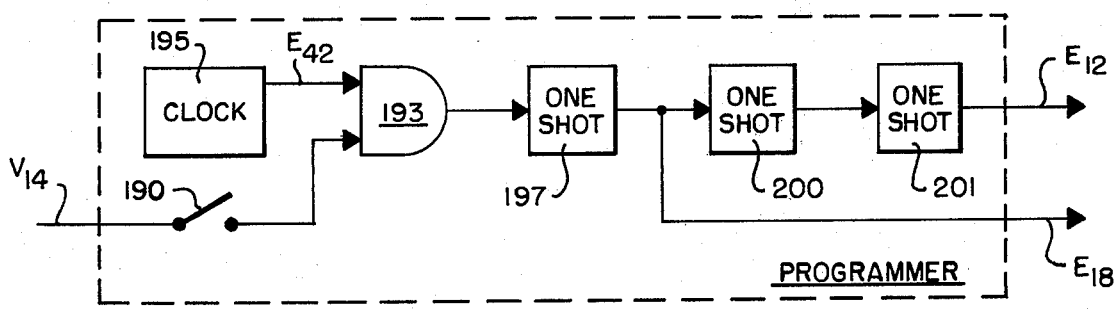

Referring to FIGS. 1, 2 and 5, programmer 87 receives a direct current voltage $V_{14}$. Voltage $V_{14}$ is applied to a conventional type on-off switch 190. Switch 190 may be activated by an operator and when so activated applies voltage $V_{14}$ to an AND gate 193. AND gate 193 is enabled by voltage $V_{14}$ from switch 190 and passes pulses $E_{42}$ from a clock 195. The frequency of the pulses $E_{42}$ is determined by the amount of time required for the overall fractionation system to stabilize after a change in an operating parameter. Each passed pulse from AND gate 193 triggers a one-shot multivibrator 197 causing it to provide an output pulse $E_{18}$. Pulse $E_{18}$ precedes pulse $E_{12}$ so that it registers 84B in storage means 130, 130A can receive the contents of registers 84A before the contents of registers 84A are changed by the occurrence of a pulse $E_{12}$.

Another one-shot multivibrator 200 acts as a time delay so that the information in the registers 84A does not change while they are being entered into registers 84B. The time delay is determined by the width of the pulse provided by one-shot 200. The trailing edge of that pulse triggers yet another one-shot multivibrator 201 to provide pulse $E_{12}$. Pulse $E_{12}$ enters all of the signals corresponding to sensed data into registers 84, 84A so that they may be stored for use as data for the next previous cycle during a next subsequent cycle.

The control system of the present invention as hereinbefore described controls the external reflux rate and reboiler temperature of a fractionation tower. The tower may also be a di-isobutanized tower, a debutanizer tower, a depropanizer tower or a de-ethanizer tower.

What is claimed is:

1. A system for controlling a tower which receives feedstock at a predetermined flow rate, and provides an overhead product, a portion of which is fed back to said tower at some external reflux rate and also provides a bottom product, a portion of which is fed back to said tower, comprising means for sensing the temperatures of the overhead product leaving the tower and of the feedback portion of the bottom product, means for sensing the flow rate of the feedstock and the external reflux rate, means for providing signals corresponding to the impurities contained in the overhead product and bottom product, and means connected to the sensing means and to the impurities signal means for controlling the external reflux rate of that portion of overhead product being returned to the tower and for controlling the temperature of the bottom product in accordance with the temperature signals, the flow rate and external reflux rate signals and the impurities signals, said control means includes first storing means for providing signals corresponding to the sensed impurities of the bottom products and the overhead product for a next two previous operation steps, second storing means for providing signals corresponding to an internal reflux rate, the external reflux rate, the overhead tower vapor temperature, reflux rate signal means connected to all the sensing means and to all the storing means for providing a signal corresponding to a determined target external reflux rate in accordance with the signals from the sensing means and the storing means, temperature means connected to all the sensing means and to all the storing means for providing a signal corrsponding to a determined target temperature for the bottom products in accordance with the signals from the sensing means and the storing means, means for providing signals corresponding to a desired target external reflux rate and to a desired target temperature, means connected to the desired target signal means and to the determined target external reflux rate signal means for controlling the external reflux rate signals, means connected to the desired target signal means and to the determined target temperature signal means for controlling the temperature of the bottom products in accordance with the desired and the determined target temperature signals and program means connected to the determined target external reflux rate signal means, to the temperature signal means, to the external reflux rate control means and to the bottom products temperature control means for controlling the operation of the control system.

2. A system as described in claim 1 in which the tower is a fractionation tower.

3. A system as described in claim 1 in which the determined target external reflux rate signal means includes means for providing the determined target external reflux rate signal in accordance with the signals from all the sensing means and all the storing means and the following equation:

$$RE_{DT} = \left\{\frac{RI_1}{1+FK(TO_c-TR_c)}\right\}\left\{1+K_1\left(\frac{ERO_c+K_2(ERO_1)+K_3(ERO_2)}{RE_1}\right)\right\} + K_4(TO_c+TO_1)$$

where $RE_{DT}$ is the determined target external reflux rate; $RE_1$ is the external reflux rate for the next previous operation step; $ERO_c$, $ERO_1$ and $ERO_2$ are the mol percent of impurities in the overhead product for the current, the next previous and second next previous operational steps, respectively, $RI_1$ is the internal reflux rate for the next previous operational step and $TO_c$ and $TO_1$ are the overhead product vapor temperatures for the current and the next previous operational steps, respectively.

4. A system as described in claim 3 in which the temperature signal means includes means for providing the temperature signal corresponding to a determined target temperature $TB_{DT}$ for the bottom product in accordance with the stored temperature signal from the storing means, the stored impurities signal corresponding to the mol percent of impurities in the bottom product from the impurities signal means and the stored flow rate signal from the flow rate sensing means of the feedstock and signals corresponding to mol percent of impurities in the bottom product and to the feedstock flow rate for the next previous operational step and the following equation:

$$TB_{DT} = TB_1 + K_5\{ERB_c + K_6(ERB_1) + K_7(ERB_2) + K_8(FD_c - FD_1)\}$$

where $TB_1$ is the reboiler temperature for the next previous operational step; $ERB_c$, $ERB_1$ and $ERB_2$ are the mol percents of impurities in the bottom product for the current, the next previous and the second next previous operational steps, respectively; $FD_c$ and $FD_1$ are the feedstock flow rates for the current and the next previous operational steps, respectively, and $K_5$ through $K_8$ are predetermined constants.

5. A system as described in claim 4 in which the tower is a debutanizer tower.

6. A system as described in claim 4 in which the tower is a depropanizer tower.

7. A system as described in claim 4 in which the tower is a de-isobutanizer tower.

8. A system as described in claim 4 in which the tower is a de-ethanizer tower.

* * * * *